United States Patent [19]

Vogel

[11] Patent Number: 5,325,732
[45] Date of Patent: Jul. 5, 1994

[54] MOTION-TRANSMITTING COMBINATION COMPRISING A CASTABLE, SELF-LUBRICATING COMPOSITE AND METHODS OF MANUFACTURE THEREOF

[76] Inventor: Ferdinand L. Vogel, 4500 Lakeshore Ap. 31, Port Huron, Mich. 48060

[21] Appl. No.: 933,020

[22] Filed: Aug. 20, 1992

Related U.S. Application Data

[63] Continuation of Ser. No. 882,366, May 6, 1992, abandoned, which is a continuation of Ser. No. 451,213, Dec. 15, 1989, abandoned.

[51] Int. Cl.$^5$ .................. F16H 1/18; F16C 33/00
[52] U.S. Cl. .................. 74/424.8 R; 74/459; 384/42; 384/909
[58] Field of Search ............ 74/89.15, 484.8 R, 459, 74/468; 384/907, 912, 913, 45, 42, 300, 408, 909

[56] References Cited

U.S. PATENT DOCUMENTS

| | | | |
|---|---|---|---|
| 3,081,644 | 3/1963 | Hudgens et al. | 74/424.8 R |
| 3,567,597 | 3/1971 | Hovey et al. | 204/181.5 X |
| 3,929,396 | 12/1975 | Orkin et al. | 384/909 X |
| 3,975,968 | 8/1976 | Chaffin | 74/89.15 X |
| 4,048,370 | 9/1977 | Orkin et al. | 384/909 X |
| 4,074,585 | 2/1978 | Richaud et al. | 74/424.8 R |
| 4,100,850 | 7/1978 | Wolbrink et al. | 74/89.15 X |
| 4,106,359 | 8/1078 | Wolfe et al. | 74/89.15 X |
| 4,293,136 | 10/1981 | George | 74/574 X |
| 4,414,142 | 11/1983 | Vogel et al. | 252/506 |
| 4,431,354 | 2/1984 | Griffin | 74/424.8 X |
| 4,439,484 | 3/1984 | Mori | 384/909 X |
| 4,566,345 | 1/1986 | Erikson et al. | 74/89.15 |
| 4,767,677 | 8/1988 | Kuwayama | 384/913 X |
| 4,811,618 | 3/1989 | Takayama | 74/89.15 |
| 4,825,720 | 5/1989 | Capdepuy | 74/468 X |
| 4,848,174 | 7/1989 | Brown et al. | 74/89.15 |
| 4,859,394 | 8/1989 | Benton et al. | 74/424.8 X |
| 4,872,903 | 10/1989 | Periou | 74/424.8 X |
| 4,923,761 | 5/1990 | Shindo | 384/909 X |
| 4,962,674 | 10/1990 | Payne | 74/89.15 |

FOREIGN PATENT DOCUMENTS 1401786 7/1975 United Kingdom ........... 74/424.8 R

OTHER PUBLICATIONS

"Metals Handbook Ninth Edition," vol. 1, pp. 634 and 635, American Society for Metals, 1978.
Seitzinger, "Coating that Cut Friction," *Machine Design*, vol. 48, No. 24, Oct. 21, 1976, pp. 114–119.
Mark's Standard Handbook for Mechanical Engineers, Ninth Edition, McGraw-Hill Book Company, 1987, pp. 6–60, 6–61, and 8–17.
"New 'Synergistic' Fluoropolymer Coating for Metal," Chemical Equipment, 36, Feb. 1965.
"Tough, Slick Hide Expands Markets for Aluminum Parts," Modern Metals, 46, May 1976.
"A Coating That Makes Aluminum Hard and Corrosion-/Erosion Resistant," Manufacturing Engineering, 56, Aug. 1977.
"*Magnaplate News,*" Magnaplate Corporation, 1978.
J. M. Wilson, "Cast Epoxies Replace Metals in Mechanical Design," Materials Engineering, Apr. 1983.
T. Richardson, *Composites: A Designs Guide* 65–81, Industrial Press, Inc., 1987.
"*Tufram: The Synergistic Coating for Improving Corrosion Resistance, Hardness and Lubricity of Aluminum,*" General Magnaplate Corp., undated.
"*Synergistic Times,*" General Magnaplate Corporation, undated.

Primary Examiner—Allan D. Herrmann
Assistant Examiner—David W. Laub
Attorney, Agent, or Firm—Kenyon & Kenyon

[57] ABSTRACT

A motion-transmitting combination comprising a cast member of a self-lubricating polymer composite adapted for movable joinder with a metal member of at least one metal, metal alloy or metal mixture is provided. The metal member has a wear-resistant, porous surface layer impregnated with a self-lubricating compound, and is capable of contacting the cast member with low clearance. Methods for preparing a motion-transmitting combination comprising a cast member adapted for movable joinder with a metal member are also provided.

19 Claims, 3 Drawing Sheets

MOTION-TRANSMITTING COMBINATION COMPRISING A CASTABLE, SELF-LUBRICATING COMPOSITE AND METHODS OF MANUFACTURE THEREOF

This is a continuation of application Ser. No. 07/882,366 filed May 6, 1992, now abandoned, which is a continuation of application Ser. No. 07/451,213 filed Dec. 15, 1989 now abandoned.

FIELD OF THE INVENTION

The present invention relates generally to combinations of machine parts adapted for movable joinder with low friction and small clearance, and more specifically to a motion-transmitting combination comprising a metal member and a polymer composite member adapted for movable joinder with low friction and low clearance, and to methods of manufacture of motion-transmitting combinations.

BACKGROUND OF THE INVENTION

Known methods of fabricating closely fitting, low friction, low wear machine parts include the steps of casting a self-lubricating composite material against a mating part. For example, a journal bearing can be fabricated by casting an epoxy containing a dry lubricant such as graphite against a polished shaft which has been coated with a parting compound for facilitating separation of the parts following hardening of the epoxy/lubricant mixture. After the epoxy has cured into a hard solid, the bearing can be broken loose from the shaft and worked with a lapping compound so that it passes freely over the shaft but has a very narrow clearance. When the shaft and bearing are washed free of the lapping compound, the resulting couple displays low friction and low wear rates.

The friction and wear of the bearing can be reduced still further by applying a dry lubricant coating to the shaft, usually by spraying and baking. Despite the reduction of friction and wear attained through application of the dry lubricant coating to the shaft, however, serious disadvantages attend its use. If the dry lubricant coating is applied following the lapping operation, the clearance of the two mated parts is changed. The resulting fit will either be too tight or too overlapped to provide allowance for the drylubricant coating is applied prior to the lapping step, most of the coating will be worn away by the abrasive lapping compound so that its friction-and wear-reducing effect is diminished or removed.

Therefore, there is a need for machine parts and methods of forming mated machine parts which exhibit close fit in combination but which are significantly less susceptible to friction and wear than currently available combinations of machine parts.

Accordingly, it is an object of the present invention to provide low friction, low wear, self-lubricating machine part combinations such as shaft/rotary bearing combinations, shaft/linear bearing combinations, screw/nut combinations and the like, and methods for making the same.

Another object of the invention is to provide machine member combinations useful in a wide range of environmental conditions.

Yet another object of the invention is to provide machine member combinations of high precision which exhibit low friction and wear under continuous, extended, industrial use.

SUMMARY OF THE INVENTION

These and other objects are achieved by the present invention which provides a motion-transmitting combination of two parts: a member formed of a self-lubricating polymer composite, and a metal member formed of at least one metal, metal alloy or metal mixture. The polymer composite member is adapted for movable joinder with the metal member, which has a wear-resistant, porous surface layer that is impregnated with a self-lubricating compound. When the members of the present combination are joined, the coated metal member contacts the cast member with low clearance.

The present invention is also directed to a method for manufacturing a motion-transmitting combination comprising a polymer composite member adapted for movable joinder with a metal member as characterized above. The method includes the steps of:

(a) providing a metal member having a wear-resistant porous surface layer;

(b) impregnating the wear-resistant, porous surface layer of the metal member with a self-lubricating compound;

(c) contacting the impregnated metal member with a shapable mixture of a polymer and a self-lubricating compound;

(d) hardening the mixture to form the polymer composite member; and (e) working the polymer composite member against the metal member, preferably with a lapping compound, to adapt the polymer composite member for movable joinder with the metal member while maintaining low clearance between the polymer composite member and the metal member.

Advantageously, rotary bearing/shaft combinations, linear bearing/shaft combinations, screw/nut combinations, linear bearing/spline combinations, slide/machine way combinations, rotor/housing combinations, gears, cam mechanisms, load bearing rails and wheels of conveyed vehicles, and like combinations of the present invention display vastly superior performance characteristics over previously known combinations.

DETAILED DESCRIPTION OF THE INVENTION

I. Motion Transmitting Combinations

Figure 1:
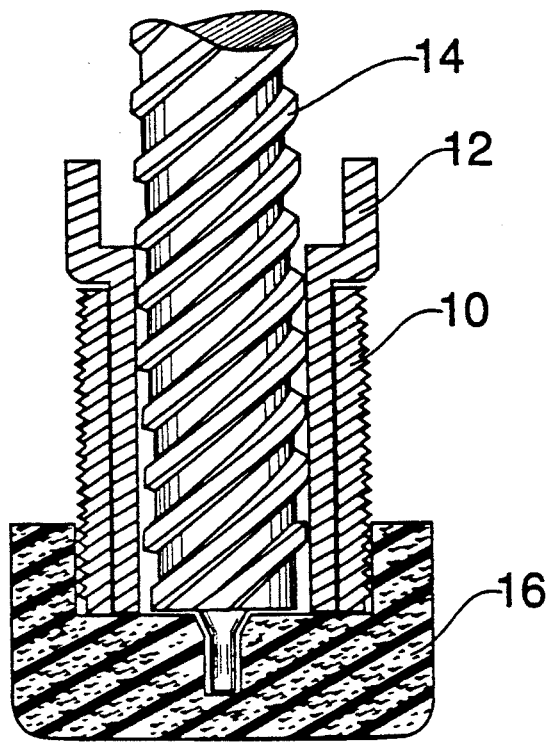
FIG. 1 is a longitudinal cross section of a metal screw with a jig and shell assembly illustrating a first stage in the manufacture of a motion-transmitting screw and nut combination according to the present invention, as described in Example 1 hereinbelow.

The objects described above are achieved in the motion-transmitting combination of the present invention, which comprises a polymer composite member adapted for movable joinder with a metal member. The metal member is formed of at least one metal, metal alloy or metal mixture, and has a wear-resistant, porous surface layer. A coating of a self-lubricating compound applied to the metal member impregnates, or extends into, the pores of the porous surface layer. The coated metal member and the polymer composite member are capable of functioning contact with low clearance.

As used with respect to the present invention, the term "motion-transmitting" refers to a combination of members, elements, or parts in which motion is transmitted by one member of the combination while the other member primarily maintains the spatial arrangement of the combination. Although a member of a combination of the present invention may be stationary in absolute terms, both members are in motion relative to one another, and thus, are "motion-transmitting." Combinations according to the present invention can also include those in which a force is transmitted between members.

The present motion-transmitting combination is adaptable to any physical embodiment having one or more mechanical contacts whereby motion and/or force is transmitted by or between the members. Examples of motion-transmitting mechanical contacts include bearing/shaft combinations including sliding bearings such as journal bearings, and rolling element bearings such as ball bearings, roller bearings, and needle bearings; threaded fastener/locking device combinations such as screw/nut and bolt/washer combinations; gears including mating or intermeshing spur gears and helical gears; clutches such as frictional clutches having two opposing surfaces in frictional contact, axial clutches utilizing disks and plates perpendicular to a shaft, and overrunning clutches in which an inner and outer member are wedged together by concentric rollers or balls riding in a race; chain drives including roller chains which are, in effect, a series of connected journal bearings forming a flexible rack; cam mechanisms; load bearing rails or tracks and the wheels of conveyed vehicles, such as railroad cars or automated guided vehicle systems, that ride upon the rail or track; and the like.

In each of these embodiments, at least one of the members of the motion-transmitting combination represents the polymer composite member, at least one other member represents the metal member, and the polymer composite member is adapted for movable joinder with the metal member. As used herein, the phrase "adapted for movable joinder" means that one is capable of movement relative to the other member, when the two members are joined. For example, a motion-transmitting combination according to the present invention can comprise a stationary (in absolute terms) metal shaft and a polymer composite bearing which rotates about the shaft. Alternatively, both members may be capable of movement, as in the case of two intermeshing spur gears, or the polymer composite member may be stationary (in absolute terms) and the metal member movable, for example a metal ball bearing/polymer composite housing combination.

The metal member of the present combination, having a wear-resistant, porous surface layer impregnated with a self-lubricating compound, is capable of contacting the polymer composite member with low clearance. All or part of the total surface area of the metal member may contact the polymer composite member, but at least that portion of the metal surface which contacts the polymer composite member is wear-resistant, porous and impregnated with a self-lubricating compound. "Impregnated", as used herein, means that the self-lubricating compound extends into the pores of the porous surface layer of the metal member. As discussed above, mechanical contacts resulting from previously known combinations of machine parts have disadvantageously exhibited substantial friction and wear, resulting in unacceptable deviations from specified dimensions of the machined parts. As used with respect to the present invention, the phrase "low clearance" means that when the impregnated wear-resistant, porous surface of the present metal member is in contact with the polymer composite member and one or both members moves against the other, the wear-resistance and friction exhibited by the present combination are such that the members fit snugly and tightly together, yet are freely movable with respect to each other. Preferably, the clearance between the metal member and the polymer composite member, when joined, ranges from about 2.5 $\mu$m or 0.0001 inches to about 100 $\mu$m or 0.04 inches, and more preferably ranges from about 5 $\mu$m or 0.0002 inches to about 50 $\mu$m or 0.002 inches.

The present invention is not limited to two-member combinations, but is also intended to encompass motion-transmitting combinations of multiple polymer composite members and single metal member, of a single polymer composite member and multiple metal members, or of multiple polymer composite members and multiple metal members. For example, in a typical ball bearing application, multiple rolling elements or balls are equally spaced around a circular channel or track formed by two rings or races. Upon application of an applied load to the bearing, the load is distributed unevenly through the race to several or all of the rolling elements. Furthermore, the present invention does not contemplate any limitation with respect to which member or members transfers motion to one or more other members. Although typically a force or forces will be transmitted form the metal member to the polymer composite member, forces may also be transmitted from the polymer composite member to the metal member.

II. Polymer composite Member

At least one member of the present force-transmitting combination is formed of a self-lubricating polymer composite preferably, the composite comprises a substantially homogeneous mixture of a polymer and a self-lubricating compound.

The polymer of the self-lubricating polymer composite can be any organic polymer which will form a substantially uniform mixture with the self-lubricating compound. Useful polymers, once cast or set, will be substantially infusible and insoluble, or will not substantially remelt, remold, dissolve, or deform in any other manner upon application of heat at operating temperatures typically encountered in industrial applications, up to about 600° F. The starting polymer materials useful in the present composite may be solid, as in the case of powders, granules, preforms such as pills, tablets, biscuits, or premolds; bulk molding compound such as premix, gel, putty, dough, or slurry; or sheet molding compounds such as flow mat or mold mat. Alternatively, the starting polymer materials may be a fluid, a semi-fluid or a liquid, as in the case of a liquid resin.

The polymer properties may be chosen as desired in order to obtain such properties as plasticity, flexibility, strength, rigidity, high or low density, temperature resistance, elasticity, deformability, adhesiveness, tackiness, polymeric bonding, crystallinity or non-crystallinity, and/or high or low molecular weight. Preferred values for these properties are:

Tensile Strength greater than about 4,000 PSI

| Tensile Modulus | greater than about | $8 \times 10^5$ PSI |
| --- | --- | --- |
| Flex Strength | greater than about | 8,000 PSI |
| Flex Modulus | greater than about | $7 \times 10^5$ PSI |
| Compression Strength | greater than about | 13,000 PSI |
| Impact Strength | greater than about | 0.5 ft-lb/in |
| Rockwell Hardness | greater than about | E 60 |

The polymers having any or an appropriately grouped number of these properties and the methods to make them are well known to those skilled in the polymer arts.

In general, the polymers useful in the present invention include thermosetting polymers, thermoplastic polymers, or polymers which have both thermosetting and thermoplastic characteristics. Useful thermosetting polymers include cross-linked or network polymers such as epoxy resins including bisphenol-A epoxy resins; allyl esters such as those formed from the monomers diallyl phthalate (DAP), diallyl isophthalate (DAIP), and allyl diglycol carbonate; amino polymers such as urea-formaldehyde (UF) and melamine-formaldehyde (MF); phenolics or phenol-formaldehyde (PF) polymers; polyesters including network polyesters such as alkyds; polyimides; cyanoacrylates; polyurethanes; silicones such as silicone resins; and mixtures thereof. For a general discussion of thermosetting polymers, see T. Richardson, *Composites: A Design Guide*, 65-81 (Industrial Press, Inc., 1987), the disclosure of which is incorporated by reference herein. Cast epoxy resins useful as engineering materials in mechanical designs are described by J. M. Wilson, "Cast Epoxies Replace Metals in Mechanical Designs," *Materials Engineering* (April 1983), the disclosure of which is also incorporated by reference herein. Various commercially available epoxies are described in "Materials of Construction: Current Literature," *Chemical Engineering*, 69-83 (Oct. 24, 1988), the disclosure of which is also incorporated by reference herein.

Thermoplastic or linear polymers which do not appreciably soften upon exposure to operating temperatures that will be encountered in use of the present motion-transmitting combination may also be useful in the present invention, e.g., polystyrene, polyethylene, poly(vinyl chloride), and poly(ethylene terephthalate). Polymers which can be characterized as both thermosetting and thermoplastic may also be useful in the present invention. For example, modified polyethylene and poly(vinyl chloride) polymers having cross-linked molecules are available which display enhanced dimensional stability under load and elevated temperatures. See. e.g. A. Rudin, *The Elements of Polymer Science and Engineering* 23-24 (1982), the disclosure of which is incorporated by reference herein.

The amount of polymer in the self-lubricating polymer composite of the present invention can range from about 30 wt-percent to about 99 wt-percent, based on the total weight of the composite, and is preferably about 70-80 wt-percent.

Self-lubricating compounds useful in the present self-lubricating polymer composite are those capable of forming a substantially uniform mixture with the polymer. These self-lubricating compounds can comprise solid lubricants such as graphite, molybdenum disulfide ($MoS_2$), and tungsten disulfide ($WS_2$) which exhibit low shear strength and low coefficient of friction due to their lamellar structure consisting of loosely bound layers held together by weak intermolecular forces. Useful self-lubricating compounds can also comprise intercalated solid materials such as the intercalation compounds of graphite or the dichalcogenides, or oxides such as silver oxide, lead oxide, cadmium oxide, or zinc oxide. Alternatively, the self-lubricating compounds can comprise a plastic lubricant such as a perhaloolefin, preferably a perfluoroolefin, for example polytetrafluoroethylene (PTFE), commercially available under the trade names Teflon®, Fluon, and Fluoroflex; or similar non-stick materials. The self-lubricating compound of the present invention may also comprise a suitable carrier, additive, filler, and the like.

The amount of self-lubricating compound in the self-lubricating polymer composite of the present invention can range from about 1 wt-percent to about 70 wt-percent, based on the total weight of the composite, and is preferably about 20-30 wt-percent.

Suitable commercial formulations of self-lubricating polymer composites useful herein include SKC 3, an epoxy material available from Gleitbelag-Technick GMbH, West Germany; Moglice P500, another epoxy material available from Diamant®MetallPlastic GMbH, West Germany; Super Alloy-Black 1500 LF, also an epoxy material available from ITW Philadelphia Resins Corporation, Montgomeryville, Pa.; and INTERCAL®EP 28, EP 66, and EP 49, which are intercalated graphite materials all available from Intercal, Port Huron, Mich. The Intercal®formulations are organic matrix composites reinforced with intercalated graphite. The preparation of these formulations is described in U.S. Pat. No. 4,414,142, the disclosure of which is incorporated by reference herein.

III. Metal Member

The present motion-transmitting combination also comprises at least one metal member. The metal member can comprise any metal or alloy of sufficient strength to withstand and transmit the motion and/or forces present in the desired application. Useful metals generally include aluminum, chromium, copper, iron, titanium, nickel, tungsten, vanadium, zinc, zirconium, or alloys or mixtures thereof. Specific selections from the above list of metals may be appropriate only for inclusion in alloys or mixtures. Preferred alloys include steels and aluminum alloys. Metal mixtures useful in the present invention may include nonmetallic materials such as carbon.

The metal, metal alloy or metal mixture properties may be chosen as desired to obtain such properties as corrosion resistance, yield strength, tensile strength, elongation, hardness, ductility, density, specific gravity, melting point, thermal conductivity, electrical resistivity, tensile modulus of elasticity, and formability. Those metals, metal alloys or metal mixtures having any or an appropriately grouped number of these properties are well known to those skilled in the metal arts. The choice of values for these properties will depend upon the particular application involved. Under typical requirements for transfer of mechanical motion or force, examples of such values may be:

| | |
|---|---|
| Yield Strength | 8,000–40,000 PSI |
| Tensile Strength | 30,000–150,000 PSI |
| Compressive Strength | 40,000–200,000 PSI |
| Impact Strength | 10–150 ft-lbs (measured by Charpy v-notch test) |
| Hardness | Rockwell H50-C60 |

The surface of the present metal member is porous. As used herein, the word "porous" means that a surface layer on the metal has sufficient pore structure or porosity to allow an effective amount of a self-lubricating compound applied to the surface of the metal to extend into the pores. Preferably, the percent porosity of the surface layer of the metal member, prior to its impregnation, ranges from about 1 to about 35 percent by volume, and more preferably ranges from about 10 to about 15 percent by volume.

The porous surface layer of the present metal member is also wear-resistant. Wear-resistance may be an inherent characteristic of the metal, metal alloy or metal mixture used to form the metal member, or may be artificially attained in any manner known to the art, for example through anodizing or by application of an external electroless coating. See also the more detailed description of how to attain the wear-resistant porous layer in the method description, below.

A coating comprising a self-lubricating compound is applied to the wear-resistant porous surface layer of the metal member of the present motion-transmitting combination in order to provide reduced friction and increased resistance to abrasion and wear, over and above the wear-resistance conferred by the nature of the metal surface prior to application of the coating. Any of the self-lubricating compounds described hereinabove as useful in the self-lubricating polymer composite member may also be utilized as the self-lubricating compound of the coating for the metal member.

A preferable arrangement of the coated metal member is believed to result from the impregnation or extension of the coating of the self-lubricating compound into the pores of the surface of the metal member. In this manner appropriate bonding between the metal surface and the coating can be obtained.

The coating comprising a self-lubricating compound may be a fluoropolymite telomere powder. A suitable commercially available spray of this powder is GP 1589, sold by Acheson Colloids Co., Port Huron, Mich.

The coating comprising a self-lubricating compound may be one of the commercially available "synergistic" coatings such as Tufram®, sold by General Magnaplate Corporation, Linden, N.J.. A synergistic coating may be defined as one in which the base metal, the intermittent bonding layer, and the infused or impregnated polymer surface become an integral material with properties different from those of the original components. The product brochure entitled "Tufram: The Synergistic Coating for Improving Corrosion Resistance, Hardness and Lubricity of Aluminum," General Magnaplate Corp.; the article "Tough, Slick Hide Expands Markets for Aluminum Parts," *Modern Metals,* 46 (May, 1976); and the article "A Coating that Makes Aluminum Hard and Corrosion/Erosion Resistant," *Manufacturing Engineering,* 56 (August, 1977); all of which are incorporated by reference herein, disclose that a Tufram® coating on aluminum impregnates tetrafluoroethylene (TFE) into the aluminum surface, which may or may not have been anodized prior to application of the coating. The coating preferably provides increased wear resistance and permanent dry lubricity. Another commercially available synergistic coating is Lectrofluor, also developed by General Magnaplate Corp., which incorporates Allied Chemical's Halar® fluoropolymer into ferrous and non-ferrous metals. The Lectrofluor product is described in the product brochure "Synergistic Times," General Magnaplate Corporation; and "New ,Synergistic, Fluoropolymer Coating for Metal," *Chemical Equipment,* 36 (February, 1965); the disclosures of which are incorporated by reference herein. A third synergistic coating is commercially available under the trade name NEDOX from General Magnaplate, as described in "Magnaplate News," Magnaplate Corp. (1978), the disclosure of which is incorporated by reference herein. The product Hardlube, commercially available from Pioneer-Norelkote of Green Bay, Wis., is another coating useful for anodizing aluminum and treating with polytetrafluoroethylene (PTFE) to preferably provide the treated part with the desired friction, wear and abrasion resistance.

IV. Preparation Methods

Methods for preparing a motion-transmitting combination comprising a polymer composite member adapted for movable joinder to a metal member are also provided by the present invention.

As an initial step of the method, a metal member is provided which has a wear-resistant, porous surface. This type of surface may be inherent in the metal member. If not, such a surface may be accomplished by anodizing the surface of the metal member. Anodizing, a process well known in the metal-finishing art, involves immersing the metal member in an electrolytic bath, such as a 50% sulfuric acid solution, and passing an electric current through the bath. The metal member to be anodized is made the positive terminal. The current density is preferably about 25 amps/ft$^2$, and the length of time of the immersion is preferably at least about 1 hour.

Anodizing also represents a method of obtaining an oxide surface on a metal member of the present method. For example, an aluminum member can be anodized to form an aluminum oxide layer on the surface of the member. This layer has a wear-resistant, porous structure suitable for impregnating with a self-lubricating compound as described above.

Alternatively, the wear-resistant, porous surface layer on the metal member may be formed by applying an electrolytic layer of nickel or chromium. Chromium is particularly useful in this regard because of its hardness. Alternatively, a porous zinc phosphate layer may be bonded to the metal surface.

The wear-resistant, porous surface layer of the metal member may also be provided by appropriate selection of metals from which to form the member. For example, sintered powdered metals having 1–35 percent porosity are well known and can be utilized to provide a porous surface.

The next step of the present method involves impregnating the porous surface of the metal member with a self-lubricating compound. Useful self-lubricating compounds can comprise solid lubricants, such as graphite, molybdenum disulfide ($MoS_2$), and tungsten disulfide ($WS_2$) which exhibit low shear strength and low coefficient of friction due to their lamellar structure consisting of loosely bound layers held together by weak intermolecular forces; intercalated solids such as the intercalation compounds of graphite or the dichalcogenides; or oxides such as silver oxide, lead oxide, cadmium oxide or zinc oxide. Alternatively, the self-lubricating compounds can comprise plastic lubricants such as a perhaloolefine, for example polytetrafluoroethylene (PTFE) which is commercially available under the trade names Teflon®, Fluon, and Fluoroflex; or similar non-stick materials. The self-lubricating compound may also comprise a suitable carrier, addditive, filler, or the like.

The coating of the self-lubricating compound can be applied in any manner effective to ensure that the self-lubricating compound impregnates or extends into the pores of the porous surface layer of the metal member. For example, the coating may be sprayed onto the surface layer, applied with a brush or roller, or the metal member may be immersed in a tank or vat of the self-lubricating compound. After application of the self-lubricating coating, the coated metal member should be allowed to stand for a length of time sufficient to dry or set the coating within the pores of the porous surface layer of the metal member followed by baking at 200°–300° F. for at least about one hour to fix the coating.

The next step of the present method is contacting the impregnated surface of the metal member with a shapable mixture of a polymer and a self-lubricating compound, and hardening the resulting composite material in order to form the polymer composite member. As used herein, the phrase "shapable mixture" means any fluid, semi-fluid, solid, or semi-solid mixture of a polymer and a self-lubricating compound which, when contacted with the metal member, is sufficiently castable, formable, moldable, or malleable to conform or adapt to the shape of the metal member upon hardening. Useful polymers of the shapable mixture include the thermosetting polymers, the thermoplastic polymers, and the polymers which have both thermosetting and thermoplastic characteristics, as defined hereinabove. The shapable mixture to be hardened may be held in contact with the coated surface of the metal member by encasing it in a shell or other casing which can constitute the outer surface of the polymer composite member and will act as a form for casting the shapable mixture. Alternatively, the shapable mixture may be sprayed, brushed, or rolled onto the metal member.

Once shaped, the composite material can be hardened by any suitable method known to those of ordinary skill as appropriate for the hardening reaction of the polymer chosen. For example, if the polymer is a polyolefin with pendant olefin groups and an internal catalyst, or is a blocked polyisocyanate, the composite may be hardened by placing the polymer composite mixture in the shell and the metal member (surrounded by the shell) in a curing oven. The curing oven may provide infrared, convective, or conductive heating. Typical operating temperatures for curing ovens are between about 300° F. and 400° F. Curing ovens are commercially available from Glenro, Inc., Peterson, N.J.; Radiation Systems, Inc., Wyckoff, N.J.; and BGK, Inc., Minneapolis, Minn. If the polymer comprises one or more polymers with pendant glycidyl and acid groups, the shapable mixture may also be cured by allowing the material to stand at least about 24 hours at room temperature to harden the mixture. Preferably, additional post-curing may be performed following the standing at room temperature to ensure that the composite material is fully hardened.

Once the composite has hardened, the next step of the present method involves working the hardened composite against the metal surface with a lapping compound to provide proper clearance between the polymer composite member and the metal member. Lapping compounds and their use are well known to those of ordinary skill in the metal-working arts. Suitable commercially available lapping compounds include the TimeSaver series of lapping compounds made by Time-Saver Products Company of Franklin Park, Ill.; and the Clover® series of lapping compounds made by Fel-Pro Incorporated, Skokie, Ill..

Following lapping of the polymer composite member with the metal member, both members may be washed with soap and water or a suitable solvent such as acetone to remove any remaining lapping compound. The surfaces of the metal member and the polymer composite member may optionally be given a coating of grease or other fluid lubricant before their use.

The invention will be further described by reference to the following detailed examples.

EXAMPLE 1

Anodized Aluminum screw with Polymer Composite Nut

An ACME threaded screw 1" in diameter, 12" long with a 0.25" lead was machined out of an extruded round rod of 6061 aluminum alloy. The screw was then lapped to a medium-fine finish (6 to 12 micro inches RMS) using a mixture of light machine oil and 60N lapping compound made by TimeSaver Products Company of Franklin Park, Ill.. The screw was then thoroughly cleaned with soap and water and anodized to produce a 0.002" thick, hard oxide coating by using the proprietary process of BTM Corporation of Marysville, Mich. The anodized screw was subsequently treated with PTFE by BTM Corporation to obtain a self-lubricating finish.

Figure 2:
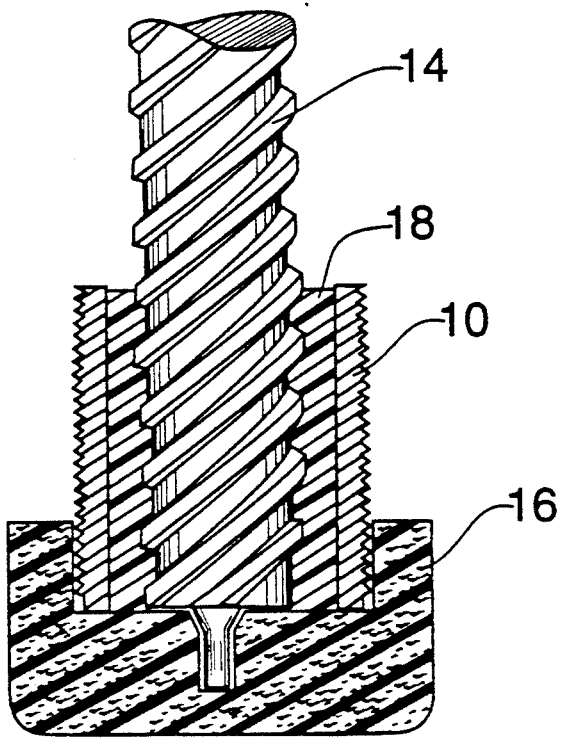
FIG. 2 is a longitudinal cross section of the screw of FIG. 1 with a polymer composite nut and shell assembly illustrating a second stage in the manufacture of the screw and nut combination.

Construction of the polymer composite member is depicted in FIGS. 1 and 2. Referring first to FIG. 1, construction started with a shell 10 of extruded 6061 aluminum alloy with 1.25" inner diameter (ID) and 1.50" outer diameter (OD) cut to 2" long. A jig 12 was made of steel having at one end the ID closely fitting the major diameter of the anodized aluminum screw, and the OD closely fitting the ID of the 2" long extruded aluminum shell. The other end of the jig had an enlarged section so that its ID fitted snugly over the OD of the aluminum shell. This jig was then used to center the screw 14 in the shell while casting a soft rubber mold 16 about the lower end of the combination. The soft mold was cast using SC-131 Silicone made by Thermoset of Indianapolis, Ind. with Dow Corning 1 catalyst.

The material used to cast the internally threaded nut in the shell was a product made by ITW Philadelphia Resins Corporation designated as Super Alloy Black 1500 L.F. It was applied using the steps recommended by the manufacturer, i.e. (1) all metal surfaces were washed with trichlorethylene to remove dirt and grease; (2) the surface of the screw inside the shell 10 was sprayed with release agent (MS-122 made by Miller Stephenson Chemical Company of Danbury, Conn.); and (3) the two components of the polymer composite compound were mixed together in the prescribed amounts by pouring the hardener provided into the resin and stirring for 3 minutes.

Prior to mixing the polymer composite resin, the screw was positioned in the soft mold. As shown in FIG. 2, the polymer composite compound 18 Was poured into the cavity between the nut shell and the screw. After the cavity was filled, the wide end of the jig was positioned to center the screw in the top end of the nut shell. The polymer composite then remained at room temperature overnight to cure into a solid piece. After cure, the nut was removed from the screw for lapping.

Lapping was accomplished by applying a 50-50 (by weight) mixture of light machine oil and 60N lapping compound from TimeSaver Products Company of Franklin Park, Ill. to the screw, and running the nut back and forth until it moved freely. Then, the lapping compound oil mixture was washed from the nut and screw with acetone. At this point the process was complete, with a nut that freely turned on the screw. The clearance of the nut on the screw was approximately 13 $\mu$m or 0.0005 inches.

EXAMPLE 2

Anodized Aluminum Track with Polymer Composite Slider Car

Figure 3:
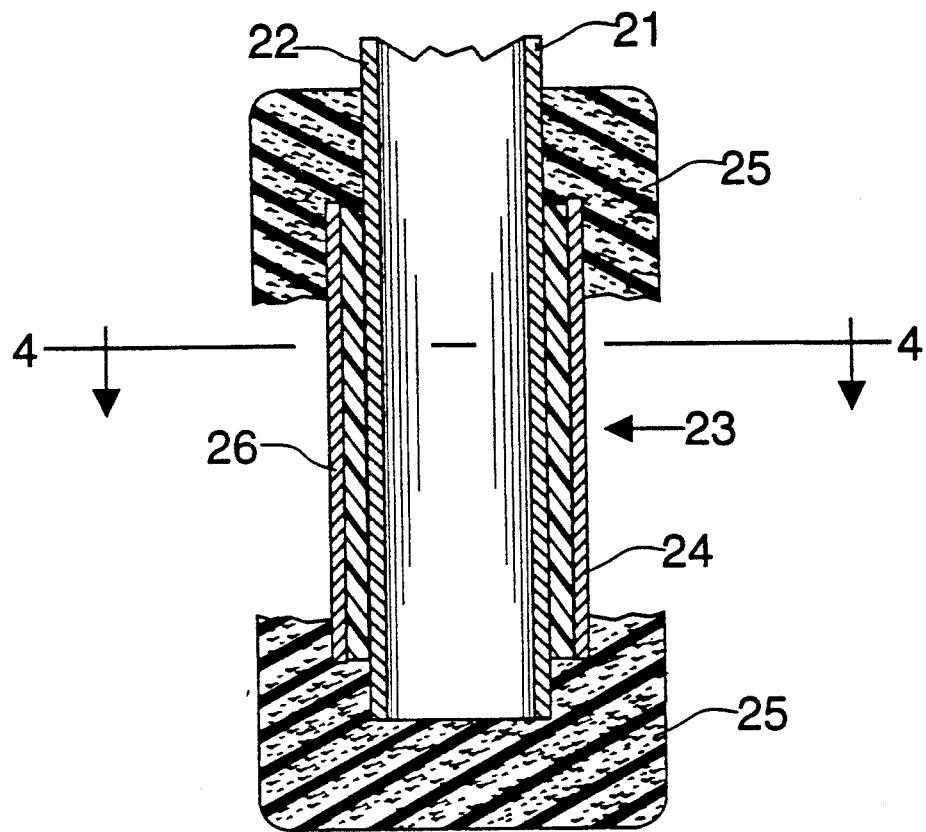
FIG. 3 is a longitudinal cross section of a metal track with a slider car shell and jig assembly taken along line 3—3 of FIG. 4 illustrating a first stage in the manufacture of an alternative embodiment of the invention as described in Example 2 below.
Figure 4:
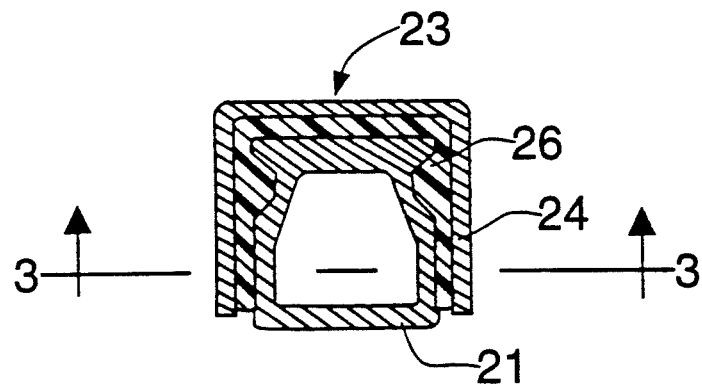
FIG. 4 is a transverse cross section of the track and a completed slider car with a polymer composite member, taken along line 4—4 of FIG. 3.

As shown in FIGS. 3 and 4, the track 21 used in this example, #155 Hi Beam Track available from Harken Yacht Fittings of Pewaukee, Wis., was an aluminum alloy extrusion having a rectangular cross-section. It was given a proprietary coating treatment, called Hardlube, by Pioneer-Norelkote of Green Bay, Wis. The Hardlube treatment consists of first anodizing the aluminum part to give it a hard wear-resistant surface 22, followed by a treatment with PTFE to make that surface self-lubricating. Prior to casting the slider car 23 on the track, the track was sprayed with a parting compound MS-122 made by Miller Stephenson Chemical Company, Inc., of Danbury, Connecticut.

Construction of the polymer composite member began with a shell 24 formed of stainless steel which constituted the outside surface of the slider car and acted as a form for casting the polymer composite material. The shell 24 was held in place by polyurethane washers 25 which were made similarly to the soft rubber mold described in Example 1. The polyurethane washers 25 positioned the metal track 21 inside the shell 24 and dammed up the ends of the shell around the track to contain the fluid polymer composite mixture.

The self-lubricating two-part epoxy INTERCAL-®EP 28, available from Intercal of Port Huron, Mich., was mixed in the proportions recommended in the manufacturer's instructions and poured into the shell. The cast mixture was then allowed to stand overnight at room temperature of 70° F. to harden. The following day the polymer composite mixture was post cured for two hours at 180° C. (356° F.), after which the polymer composite member 26, now a car or linear bearing that could glide along the track, was removed by sliding it off the end of the track. The inside surface of the polymer composite member 26 in contact with the metal track was coated with an oil mixture of 60N medium lapping compound made by TimeSaver Products Company of Franklin Park, Ill., and the car was lapped against the track for an accumulated distance of 50 feet to give sufficient clearance for easy motion.

After lapping was completed, the parts were separated, washed with acetone to remove the lapping compound-oil mixture, and the mating surfaces given a light coating of Gredag 740, a grease made by Acheson Colloids Company of Port Huron, Mich.. While aluminum alloys are, of course, a silvery white color, the Hardlube anodized coating was a smooth, uniform dark gray. After lapping there was no evidence of wear on the Hardlubed aluminum alloy surface, i.e., no change in color density of the coating in the lapped areas compared to other areas not in contact with the polymer composite surface, no striations on the surface, or other indications of minor metal removal.

EXAMPLE 3

Hard Chromium-Coated Round Steel Shaft with Moglice®Polymer Composite Bushing

Figure 5:
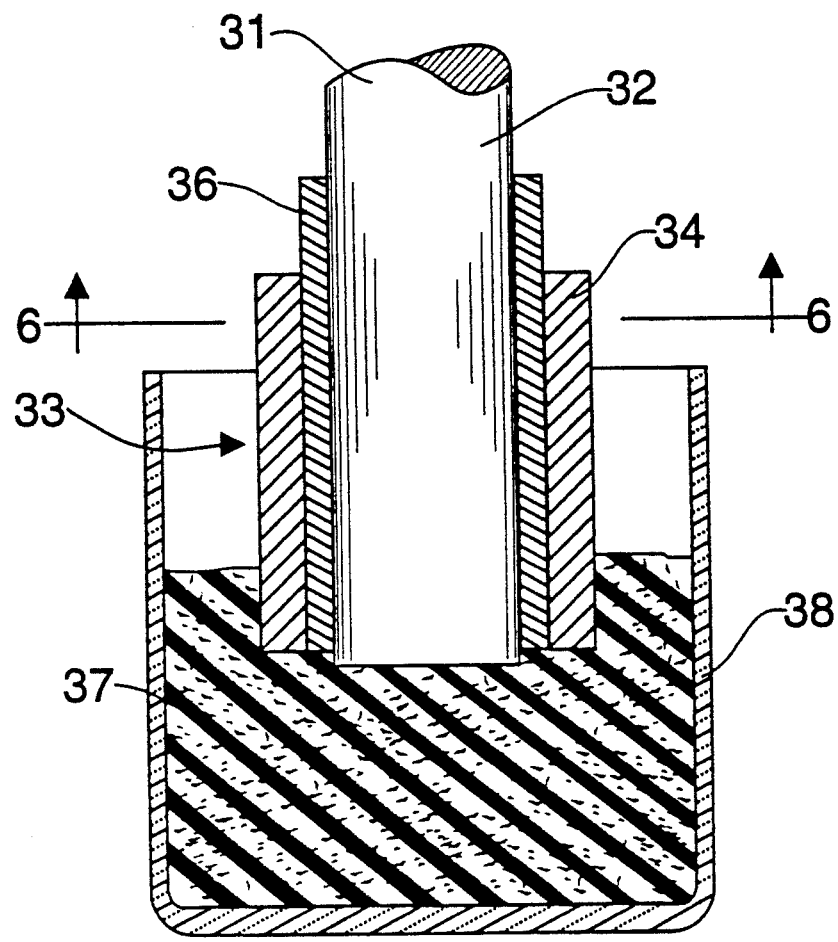
FIG. 5 is a longitudinal cross section of a round shaft with a bushing and jig assembly illustrating a first stage in the manufacture of a second alternative embodiment of the invention as described in Example 3 below.

As shown in FIG. 5, a round shaft 31 used in this example was 1" in diameter by 12" long cold-rolled SAE 1060 steel. Electroplating was used to provide the shaft surface with a wear-resistant coating of chromium. This coating was a modified hard electroplated chromium, 1/1000 to 2/1000 of an inch thick, with a hardness of Rockwell C72. This semiporous coating was impregnated with PTFE to produce a wear-resistant surface layer 32 impregnated with a self-lubricating compound.

Figure 6:
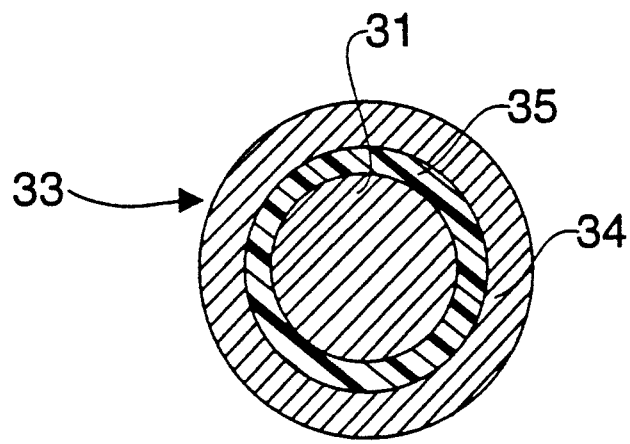
FIG. 6 is a transverse cross section of the shaft and a completed bushing with a polymer composite member, taken along line 6—6 of FIG. 5.

Fabrication of a sliding bushing 33 began with machining of a circular cylinder to act as a shell 34 for casting a self-lubricating polymer composite member 35 (see FIG. 6). The cylinder had an inside diameter of 1¼", an outside diameter of 1¾", and was 2" long. The inside surface of the shell 34 was roughened to promote adherence of the cast liner.

A jig 36 used to center the shaft 31 in the shell 34 consisted of a cylinder having a 1" inside diameter that fitted snugly inside the shell. A soft mold 37 was made to cover one end of the shaft/shell combination by holding the shaft and shell in a vertical position with the shaft 31 extending about ⅛ inch below the bottom edge of the shell 34, with the jig 36 in position between the shell 34 and shaft 31. The assembly was held in the vertical position inside a 3" diameter by 3" deep container 38. Silastic molding compound, supplied by Thermoset Plastics, Inc. of Indianapolis, Ind., was poured around the bottom of the assembly to a depth of 2". The Silastic was allowed to cure overnight, and the jig 36 was removed from the annular space between the shell 34 and shaft 31.

The cast liner of the bushing 33 was composed of Moglice PL500, a two-component epoxy-based self-lubricating polymer composite material made in Germany by Diamant®and imported into the U.S.A. by Devitt Machinery Company. Following the manufacturer's directions, the epoxy-based material was mixed by pouring the premeasured components together and stirring for three minutes. Meanwhile, the shaft 31 was removed from the mold 37, sprayed with a parting compound MS-122, and returned to its position in the mold. With the shaft in place, the Moglice®PL500 mixture was poured into the cavity between the shaft and shell and allowed to cure for 16 hours at room temperature.

After the cast self-lubricating polymer composite member 35 was thoroughly cured, the shaft and bushing assembly was removed from the Silastic mold and the bushing broken loose by forcing it along the shaft. At this stage the bushing was moved on the shaft only with difficulty, because there was substantially zero clearance between the two parts. The proper amount of clearance, i.e., so that the bushing moved freely on the shaft, was obtained by lapping with a mixture of 60N medium lapping compound made by TimeSaver Products Company of Franklin Park, Ill.

The present invention has been described with reference to various specific and preferred embodiments and techniques. However, it should be understood that many variations and modifications may be made while remaining within the spirit and scope of the invention.

What is claimed is:

1. A motion-transmitting assembly comprising a metal member and a polymer composite member, the polymer composite member being mounted in relatively movable clasping engagement with a surface portion of the metal member, wherein
   the metal member has a wear-resistant self-lubricating surface consisting of a porous metal oxide layer or a porous electrolyzed metal layer, with a porosity between about 1 percent and about 35 percent by volume, and a first self-lubricating compound impregnated into the pores of the metal oxide or electrolyzed metal layer,
   the polymer composite member is a self-lubricating polymer composite comprising a thermosetting, thermoplastic or thermoset/thermoplastic polymer and a second self-lubricating compound wherein the second self-lubricating compound is about 1–70 percent by weight of the total self-lubricating polymer composite, the polymer composite member being encased in a metal shell, and
   wherein there is low clearance between the metal member and the polymer composite member.

2. An assembly according to claim 1 wherein the low clearance is between about 2.5 μm (0.0001 inch) and about 100 μm (0.04 inch).

3. An assembly according to claim 1 wherein the first self-lubricating compound comprises graphite, intercalated graphite, molybenum disulfide, tungsten disulfide, a perhaloolefin, silver oxide, lead oxide, cadmium oxide, zinc oxide, or a mixture thereof.

4. An assembly according to claim 3 wherein the first self-lubricating compound comprises a perhaloolefin.

5. An assembly according to claim 4 wherein the perhaloolefin is polytetrafluoroethylene.

6. An assembly according to claim 1 wherein the polymer composite member is a bearing.

7. An assembly according to claim 6 wherein the bearing is a sliding bearing.

8. An assembly according to claim 1 wherein the metal member is a rod having external screw threads and the polymer composite member is a nut member having internal screw threads.

9. An assembly according to claim 1 wherein the metal member is a cylindrical shaft and the polymer composite member is a bushing.

10. An assembly according to claim 1 wherein the metal member is a load-bearing member.

11. An assembly according to claim 13 wherein the load bearing member is a rail or track.

12. An assembly according to claim 1 wherein the polymer is thermosetting and is an epoxy resin, an allyl ester, an amino polymer, a phenolic, a polyester, a polyimide, a polyurethane, a silicone, or a mixture thereof.

13. An assembly according to claim 1 wherein the polymer is about 30–99 percent by weight of the self-lubricating polymer composite.

14. An assembly according to claim 1 wherein the polymer is about 70–80 percent by weight of the self-lubricating polymer composite.

15. An assembly according to claim 1 wherein the second self-lubricating compound is about 20–30 percent by weight of the self-lubricating polymer composite.

16. An assembly according to claim 1 wherein the metal of the metal member is aluminum, chromium, copper, oron, titanium, nickel, tungsten, vanadium, zinc, zirconium, or an alloy or mixture thereof.

17. An assembly according to claim 1 wherein the wear-resistant porous surface is a metal oxide layer comprised of an anodized metal from the metal member.

18. An assembly according to claim 1 wherein the wear-resistant porous surface is an electrolyzed coating of chromium, or a coating of nickel, or a coating of zinc phosphate.

19. A motion-transmitting assembly comprising a metal member and a polymer composite member, the polymer composite member being mounted in relatively movable clasping engagement with a surface portion of the metal member, wherein
   The metal member has screw threads provided with a wear-resistant self-lubricating surface consisting of a porous metal oxide layer or a porous electrolyzed metal layer, with a porosity between about 1 percent and about 35 percent by volume, and a first self-lubricating compound impregnated into the pores of the metal oxide or electrolyzed metal layer,
   the polymer composite member is a self-lubricating polymer composite comprising a thermosetting, thermoplastic or thermoset/thermoplastic polymer and a second self-lubricating compound wherein the second self-lubricating compound is about 1–70 percent by weight of the total self-lubricating polymer composite, the polymer composite member being provided with screw threads that mate with the screw threads of the metal member and being encased in a metal shell, and
   wherein there is low clearance between the metal member and the polymer composite member.

* * * * *